(12) United States Patent
Milella, Jr. et al.

(10) Patent No.: US 11,555,511 B2
(45) Date of Patent: Jan. 17, 2023

(54) CONNECTION SYSTEM

(71) Applicant: ECA Medical Instruments, Inc., Newbury Park, CA (US)

(72) Inventors: Michael J. Milella, Jr., Thousand Oaks, CA (US); Sarah Elizabeth Schaake, Centennial, CO (US)

(73) Assignee: ECA Medial Instruments, Inc., Thousand Oaks, CA (US)

( * ) Notice: Subject to any disclaimer, the term of this patent is extended or adjusted under 35 U.S.C. 154(b) by 409 days.

(21) Appl. No.: 16/788,210

(22) Filed: Feb. 11, 2020

(65) Prior Publication Data
US 2020/0256365 A1 Aug. 13, 2020

Related U.S. Application Data

(60) Provisional application No. 62/803,954, filed on Feb. 11, 2019.

(51) Int. Cl.
*F16B 7/04* (2006.01)
*F16B 21/06* (2006.01)
*F16B 21/12* (2006.01)

(52) U.S. Cl.
CPC .......... *F16B 7/0406* (2013.01); *F16B 21/065* (2013.01); *F16B 21/125* (2013.01)

(58) Field of Classification Search
CPC .. Y10T 24/3984; F16B 21/065; F16B 21/125; A44B 11/2515; A44B 11/2511; A44B 11/2523
See application file for complete search history.

(56) References Cited

U.S. PATENT DOCUMENTS

| 4,453,292 A * | 6/1984 | Bakker | F16G 11/101 24/115 G |
| 5,737,808 A * | 4/1998 | Ikeda | F16G 11/101 24/136 L |
| 6,339,865 B1 * | 1/2002 | Takahashi | F16G 11/101 24/306 |
| 6,658,704 B2 * | 12/2003 | Buscart | F16G 11/101 24/136 L |
| 7,257,865 B2 * | 8/2007 | Kaneko | F16G 11/101 24/115 G |

* cited by examiner

*Primary Examiner* — Robert Sandy
(74) *Attorney, Agent, or Firm* — Ferguson Case Orr Paterson (57) ABSTRACT

Aspects of novel connection systems and methods are disclosed herein. A partially hollow nose is configured to one of connect a pathway to a body catch to accept a quick connect body (QCB) or mate with a connection system configured to be inserted into a shaped cavity in the nose; and, a quick connect module (QCM) and the nose are configured to cooperate to accept insertion of the QCB through the side wall of the nose into the body catch of the QCM; wherein the QCB affixes the QCM into the nose; and, wherein pushing on the button at one end of the QCB compresses the integral biasing arm of said QCB opening a catch and release interface to accept a tool.

13 Claims, 10 Drawing Sheets

CONNECTION SYSTEM

CROSS REFERENCE TO RELATED APPLICATIONS

This application claims the benefit of Provisional Patent Application No. 62/803,954, filed on Feb. 11, 2019.

BACKGROUND OF THE INVENTION

Field of the Invention

This disclosure relates to a connection system and devices.

Description of the Related Art

The medical industry has made use of both reusable and disposable tools and handles. In a surgical context, there is little room for error and the devices must be precise and simple for a surgeon to use during procedures. Torque-limiting drivers are widely used throughout the medical industry. These torque-limiting drivers have a factory pre-set torque to ensure the accuracy and toughness required to meet a demanding surgical environment.

The medical industry has made use of both reusable and disposable drivers. In a surgical context, there is little room for error and these drivers must impart a precise function. While reusable devices are robust they also require constant recalibration and/or sterilization to avoid contamination and infections.

The medical tool industry has several tool connection systems and is not standardized. Although the profile for fastening may have the same nominal values the connection interface for tools from a plethora of manufactures can have different platforms and require dedicated devices for each platform.

SUMMARY OF THE DISCLOSURE

The present disclosure provides a platform agnostic connection system. A biasing element having a catch and release interface thereon is configured to cooperate with a housing to temporarily capture tools for use. Moreover, aspects of a catch and release tool connection for each platform are disclosed.

Disclosed are aspects of connection systems having a partially hollow nose configured to mate with a connection system. The connection system may be fixed, modular or removable. In some instances, a quick connect module (QCM) is configured to cooperate with a shaped cavity formed within the nose. A quick connect body "QCB" having a biasing element, a catch and release interface and a tail end which mates with the QCM and the nose that are configured to align and cooperate to accept insertion of a QCB through an annular wall of the nose into the body catch of the QCM wherein the QCB affixes the QCM into the nose. Pushing on a button at one end of the QCB compresses an integral biasing element of said QCB aligning a catch and release interface with a pathway.

Disclosed are some aspects of connection systems having a partially hollow nose configured to mate with a connection system including a partially hollow nose configured to mate with a connection system with a quick connect module (QCM) configured to cooperate with a shaped cavity of the nose, a quick connect body (QCB) having a biasing element, a catch and release interface and a tail end the QCM and the nose configured to align and cooperate to accept insertion of a QCB through an annular wall of the nose into the body catch of the QCM; wherein the QCB affixes the QCM into the nose; and, wherein pushing on a button at one end of the QCB compresses an integral biasing element of said QCB aligning a catch and release interface with a pathway. In some instances, a button guide fit through the exterior wall of the nose configured to align the release interface with the pathway, wherein the QCB is insertable therein. In some instances, the QCB has a top surface and a bottom surface.

Disclosed are some aspects of connection systems having a partially hollow nose configured to mate with a connection system including a partially hollow nose configured to mate with a connection system with a quick connect module (QCM) configured to cooperate with a shaped cavity of the nose, a quick connect body (QCB) having a biasing element, a catch and release interface and a tail end, the QCM and the nose configured to align and cooperate to accept insertion of a QCB through an annular wall of the nose into the body catch of the QCM having at least one rib extended from the bottom surface of the QCB with at least one corresponding rib guide (307A) in the QCM being configured to accept insertion of the at least one rib wherein the QCB affixes the QCM into the nose.

Disclosed are some aspects of connection systems having a partially hollow nose configured to mate with a connection system including a partially hollow nose configured to mate with a connection system with a quick connect module (QCM) configured to cooperate with a shaped cavity of the nose, a quick connect body (QCB) having a biasing element, a catch and release interface and a tail end the QCM and the nose configured to align and cooperate to accept insertion of a QCB through an annular wall of the nose into the body catch of the QCM. Included are capture tabs formed in the shaped cavity configured to cooperate with arms formed on the QCB; and, wherein flexible portions of said arms are configured to pass one way into the cavity and catch on the tabs after flexion during passage through the nose passed the tabs. In some instances, the device includes the QCB has a proximal end a distal end and a locking region connecting the top and bottom surfaces. In some instances, the device has an internal back wall of the shaped cavity of the QCM and, the biasing element compresses when the tail is as it is pushed against said internal back wall. In some instances, the biasing element further comprises two sub arms each having a flex region, each sub arm connected at the tail end; and, wherein said flex regions are configured to compress when a predetermined force is applied to move the QCB linearly within the body catch and compressing the biasing element on the QCB.

Disclosed are some aspects of connection systems having a partially hollow nose configured to mate with a connection system including a partially hollow nose configured to mate with a connection system with a quick connect module (QCM) configured to cooperate with a shaped cavity of the nose, a quick connect body (QCB) having a biasing element, a catch and release interface and a tail end the QCM and the nose configured to align and cooperate to accept insertion of a QCB through an annular wall of the nose into the body catch of the QCM. Included are capture tabs formed in the shaped cavity configured to cooperate with arms formed on the QCB; and, wherein flexible portions of said arms are configured to pass one way into the cavity and catch on the tabs after flexion during passage through the nose passed the tabs. In some instances, the device includes the QCB has a proximal end a distal end and a locking region connecting the top and bottom surfaces the biasing element has at least one opening connecting the top and bottom surface and has at least one extended shoulder; and, wherein the at least one extended shoulder moves laterally during compression thereby aligning the interface and pathway.

Disclosed are some aspects of connection systems having a partially hollow nose configured to mate with a connection system including a partially hollow nose configured to mate with a connection system with a quick connect module (QCM) configured to cooperate with a shaped cavity of the nose, a quick connect body (QCB) having a biasing element, a catch and release interface and a tail end the QCM and the nose configured to align and cooperate to accept insertion of a QCB through an annular wall of the nose into the body catch of the QCM. Included are capture tabs formed in the shaped cavity configured to cooperate with arms formed on the QCB; and, wherein flexible portions of said arms are configured to pass one way into the cavity and catch on the tabs after flexion during passage through the nose passed the tabs. In some instances, the device includes the QCB has a proximal end a distal end and a locking region connecting the top and bottom surfaces. The biasing element is a solid member having at least one cut out and, wherein the at least one cut-out compresses when a predetermined force is applied to the button thereby aligning the interface and pathway. In some instances the biasing element has at least one triangular opening and a base.

Disclosed are some aspects of connection systems including a partially hollow nose having an annular wall with a button guide pathway there through; a body catch with a back wall connected to the button guide configured to mate with a quick connect body (QCB); and a distal end with a pathway there through which extends at least to the body catch. In some instances, the device includes a QCB with a button, an interface a tail end and a biasing element which mates within the body catch. The biasing element compresses when the tail is pushed against said internal back wall. In some instances, the biasing element further comprises two sub arms with flex regions connecting at the tail end.

The general description and the following detailed description are exemplary and explanatory only and are not restrictive of the disclosure, as defined in the appended claims. Other aspects of the present disclosure will be apparent to those skilled in the art in view of the detailed description of the disclosure as provided herein.

The summary, as well as the following detailed description, is further understood when read in conjunction with the appended drawings. For the purpose of illustrating the disclosure, there are shown in the drawings exemplary implementations of the disclosure; however, the disclosure is not limited to the specific methods, compositions, and devices disclosed. In addition, the drawings are not necessarily drawn to scale.

DETAILED DESCRIPTION OF THE DISCLOSURE

Figure 1A:
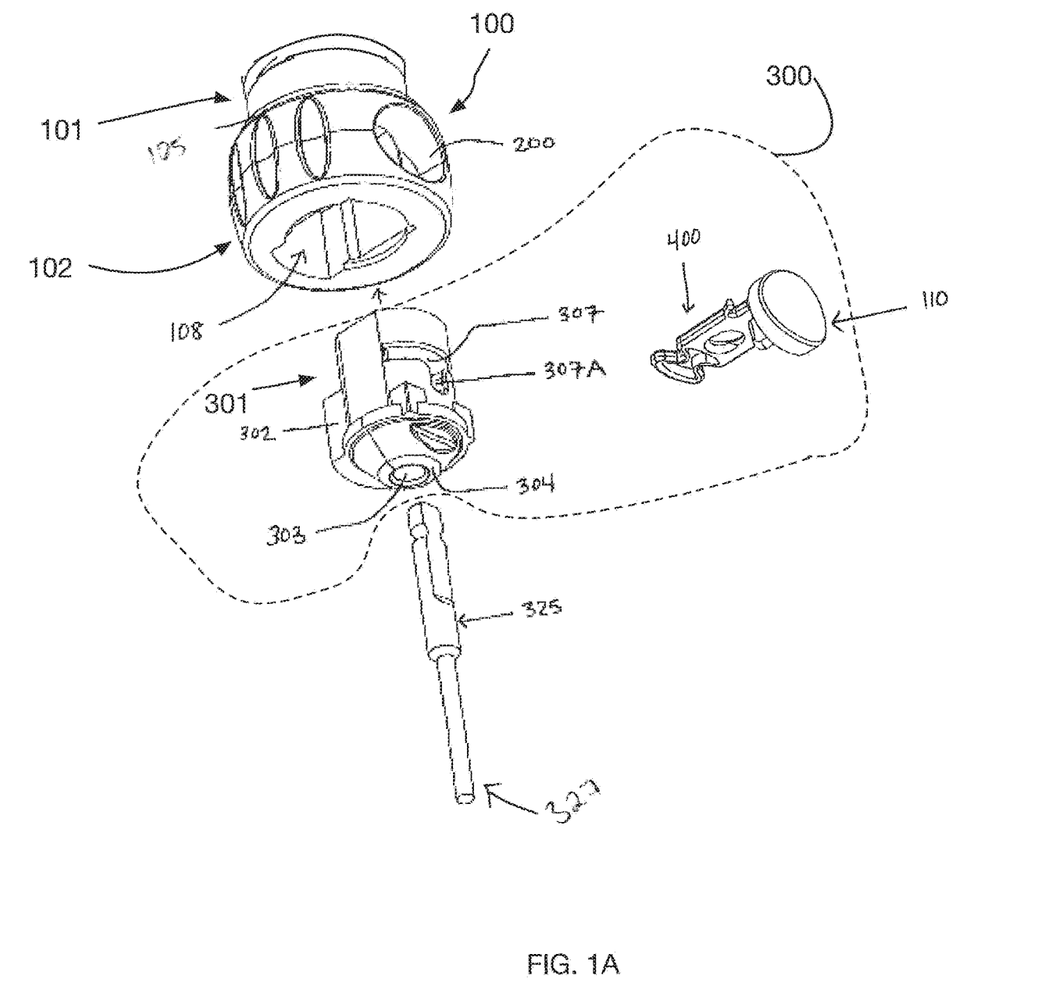
FIG. 1A is an assembly view of aspects of a Connection System (CS) fit into the nose portion of a disposable system.
Figure 1B:
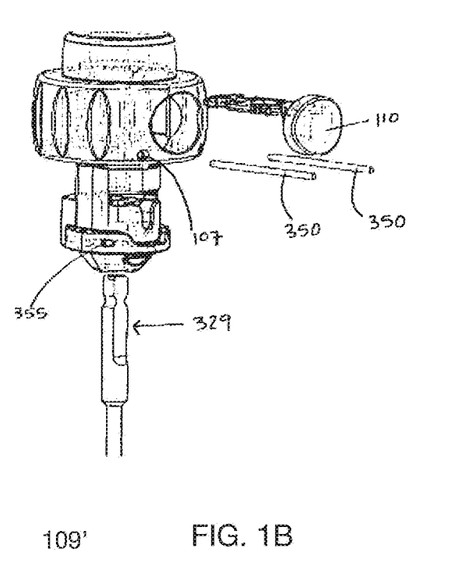
FIG. 1B is an assembly view of aspects of a Connection System (CS) with pin connection mounted into a nose assembly.
Figure 2:
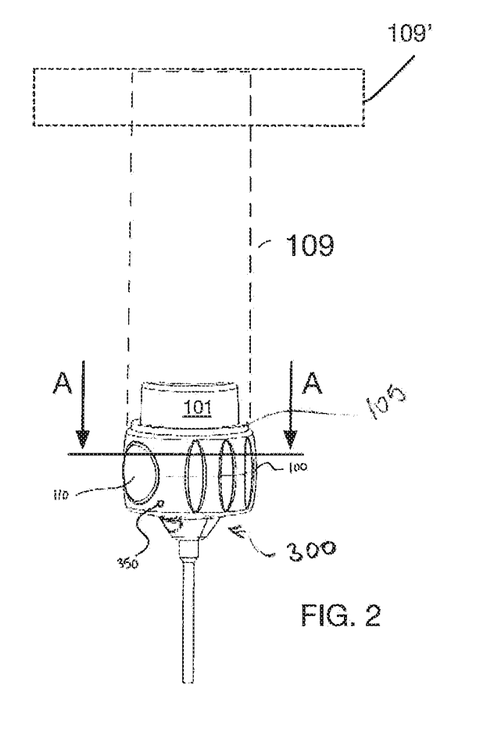
FIG. 2 is an overview of aspects of an assembled device with Connection System (CS)

Referring to FIGS. 1-7 exemplars of aspects of a connection system (CS) for medical instruments. FIG. 2 shows a handle, case or outer cover 109 which forms a shroud to enclose the swappable connection system (CS).

Unlike traditional devices that are limited by being medical tool standard format specific, the CS provides an innovative device and system that is standard agnostic. It is agnostic because the nose 100 assembly accepts a plethora of CS modules.

The nose 100 is a mounting base for the CS 300. The nose 100 is a partially open multi-function device with an extended neck 101 at its proximal end and at its most distal end is a head 102, the neck may have a smaller diameter (as shown) than the head. A circumferential rim 105 is a bearing surface between the head and neck. Optionally, one or more auxiliary pin guides 107 may be provided. Said auxiliary pin guides form guides through the head to a shaped cavity 108 therein. FIG. 2 illustrates the CS 300 affixed into the nose assembly 100 mounted into a handle 109. The neck is affixed within the handle and may nest against the circumferential rim 105. Alternatively, the handle 109 may be formed as a neck extension. In some instances, the handle portion may have one or more extended sub arms 109'. In other cases, the connection system or mount may be integral in a base.

The quick connection module (QCM) 301 is illustrated as a component of the CS. However, the example is not a limitation and those of ordinary skill in the art will understand that the QCM may be a standalone unit not requiring insertion into a connection system 300. In other instances, the QCM may be permanently fixed into a connection system.

The QCM, in this illustration, is configured to fit into the shaped cavity 108 of the nose. The QCM has a body 302 with a multitude of features. In addition to being configured to mate with the shaped cavity, it has a pathway 303 spanning from its distal end 304 to at least a body catch 307, a standard specific configuration 308 of the pathway 303 is visible at the proximal end.

The body catch 307 is formed through the QCM body 301 generally perpendicular to the pathway 303 and is configured to accept the button 110. In some instances, the body catch is shaped to conform to the shape of the quick connect body (QCB) 400. In some instances, an optional rib catch 307A is formed as part of the body catch and configured to accept an extended rib from the QCB. A button guide 200 is formed through the annular wall 101 of the nose 100 to accept the button and QCB. The pathway 303 also acts as a receiver for an elongated tool 325. The button guide is configured to be aligned with the catch and release system thereby providing a pathway 303 from the exterior of the nose to the interior of the QCM. Tool 325 has a work end 327 to engage medical device or tissue. The opposite end is the standard mounting end 329 which fits into a specific configuration 308 of pathway 303. A locking groove 330 is provided to cooperate with the catch and release system associated with the QCM. Formed as part of, or affixed to, the button is the quick connect body (QCB) 400. The QCB is configured to catch and release tools into the QCM.

The QCB has a biasing element formed thereon. The biasing element provides at least one compressible element. The compressible element may be an arm, sub arm, shoulder, base or the closing of a cut out. In some instance the compressible element is an opening through the QCB, in other instances the biasing element is one or more cut-outs through the shoulder of the QCB.

Figure 4:
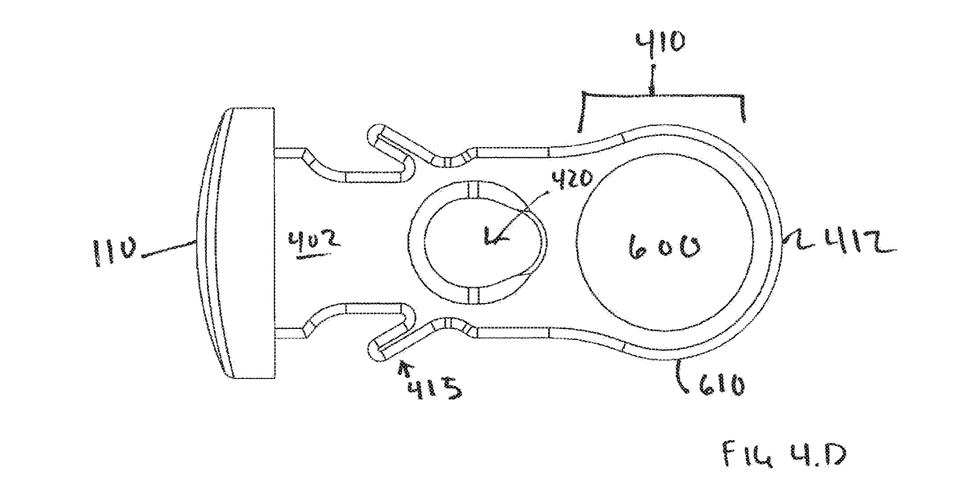
FIGS. 4A-4G illustrate aspects of cooperation of a biasing element with the tool and catch and release interface.
Figure 4A:
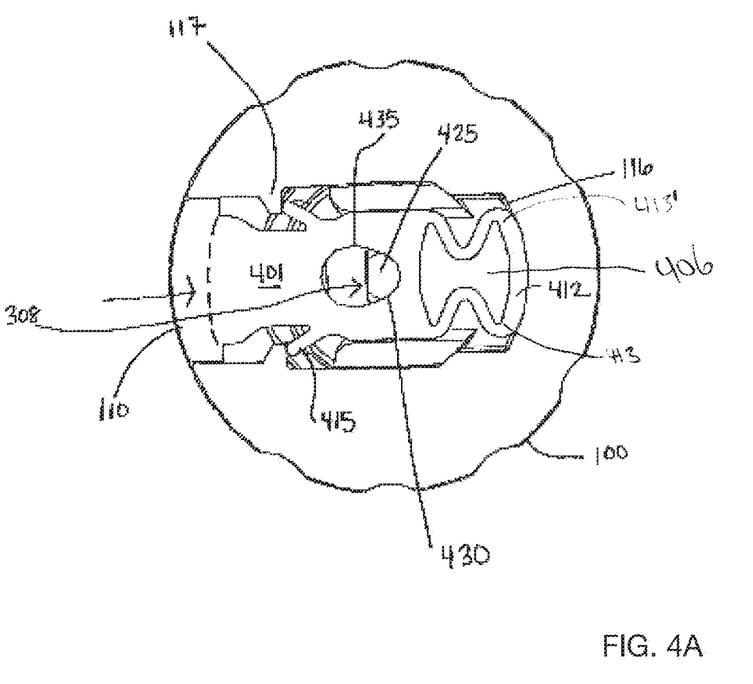
Figure 4B:
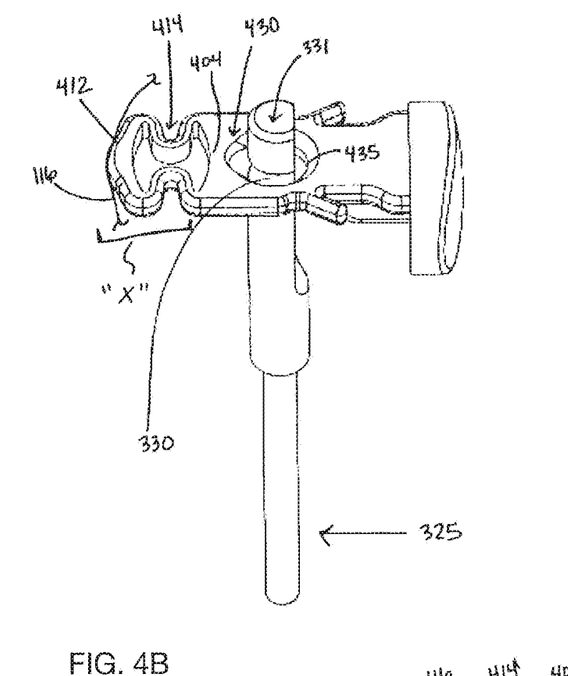

FIGS. 4A and 4B show the internal back wall 116 inside the shaped cavity 108 which is utilized to provide a platform to compress or decompress the integral biasing arm 410 against during mounting and removal of a tool. The integral biasing arm forms a figure eight shape with two sub arms 413 & 413' that indent at an elbow 414 and connect at the tail end 412. The two sub arms fold at the elbow to compress when a predetermined force is applied to the button. Those of ordinary skill in the art will recognize that the figure eight shape is not a limitation. The figure eight opening 406 formed in the QCB is internal to the QCB. Other configurations of the internal opening may be circles, polygons or complex shapes. The commonality of the opening is that it provides a predefined flexible region with memory which can expand and or compress in one or more directions to displace capture region 435 relative to the pathway 303 and the shaft for capture and release. Exemplars shown in FIGS. 4A-6 show biasing arms which impart spring or flex via a changing length. The change in length of the arm is a means to catch a tool. The biasing arms include but are not limited to one or more of shaped solid members (see FIGS. 5 & 6), members with openings forming flexible regions therein (See FIGS. 4A-4G) and by combining of openings and shaped members such as FIG. 4A-F.

FIG. 1B illustrates aspects of an exemplary of the mounting features for the QCM to the nose. In this configuration auxiliary pins 350 are configured to pass into the auxiliary pin guides 107 and into the CQM via fixation guides 355.

FIGS. 3A-3F illustrate aspects of the button 110 and the quick connect body (QCB) 400. The QCB is a member extended from the rear face 110' of the button. The extended QCB member has a top surface 401 and a bottom surface 401'. It has a proximal end 402 formed as part of or affixed to the rear face of the button. The proximal end has a shoulder 403 extended therefrom, and the shoulder is at its distal end 404 supports an integral biasing arm 410 which terminates at a tail end 412. Locking arms 415 extend from the sides 405 of the shoulder 403. A flexible portion of each arm 417 is configured to flex inward towards the shoulder side 405 to yield for insertion into the body catch 307 of the QCM. The feature is one in and never out.

The cooperation of the arms and body catch, and body catch and tool mounting end 329 is further described in reference to FIGS. 4A-4G.

Figure 3A:
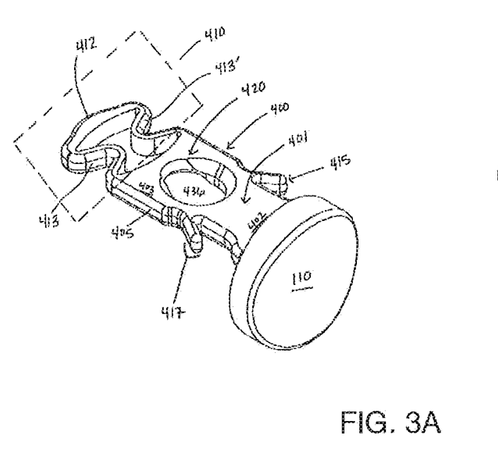
FIGS. 3A-3F are perspective, side, front, rear, top and bottom views of aspects of the of the catch and release tool connection for the Connection System (CS)
Figure 3B:
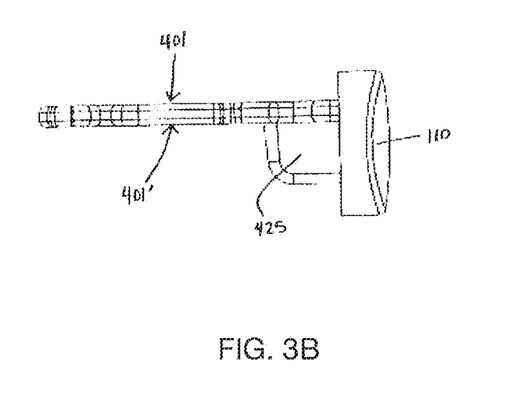
Figure 3C:
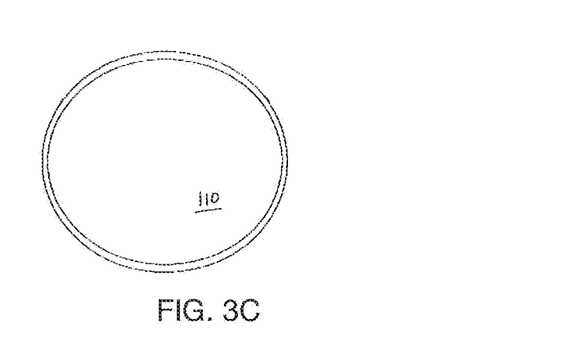
Figure 3D:
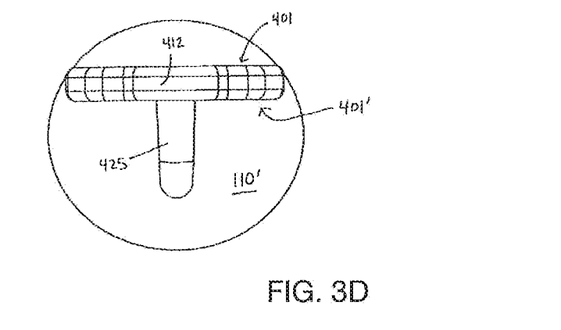
Figure 3E:
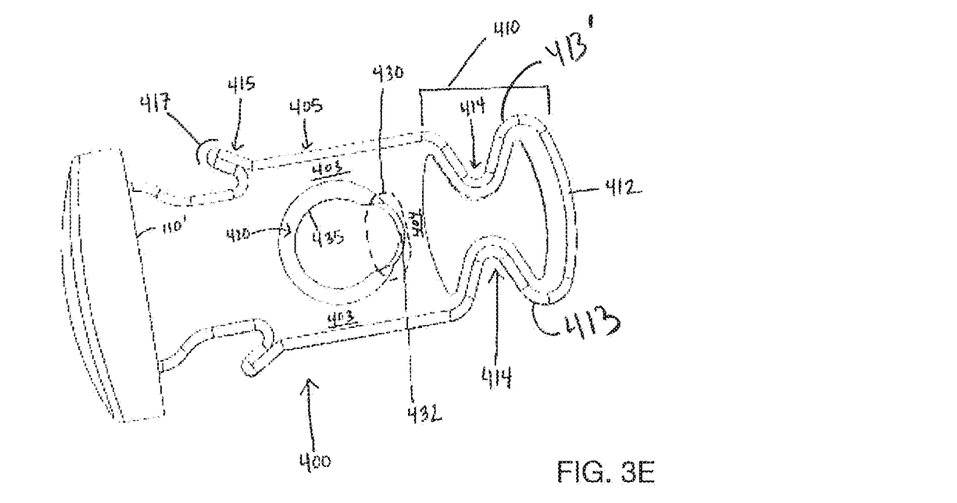
Figure 3F:
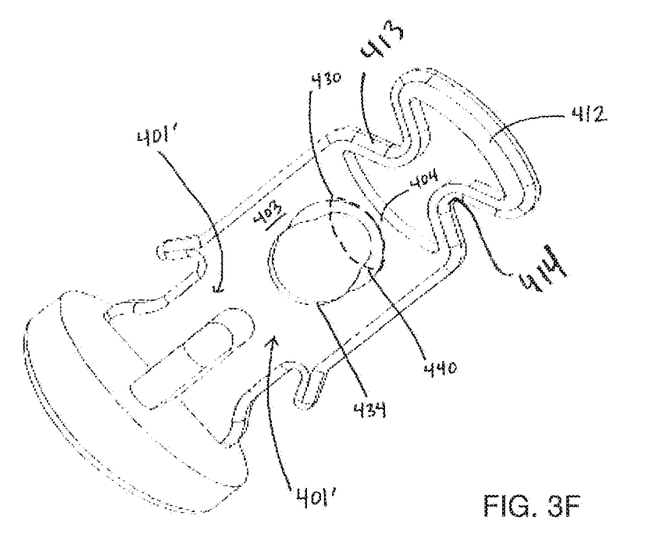

Formed near the proximal end 402 of the shoulder is a catch and release interface 420 which provides a passageway through the QCB. FIGS. 3B, D and F show the bottom surface 401' of the QCB. Optionally, a rib 425 is extended from the bottom surface 401' and the rear face 110'. The rib provides one or more of guidance for insertion, rigidity, and orientation. The rib may also provide support for the shoulder and may be used as an aid for alignment of the QCB with the QCM. The QCM catch and release interface may include a generally perpendicular rib guide or catch 307 which is configured to cooperate with the optional rib 425 during insertion of the QCB into the QCM.

The catch and release interface 420 is preferably asymmetrical configured to reversible lock the tool mounting end of the tool into the QCM. It also may be configured to direct the tool mounting end to urge open the catch and release system. On the top side of the QCB is a locking region 430 formed to catch the tool and which includes the lock catch 432 and a capture region 435 to allow insertion of the tool which defines a passage 436. On the bottom side the release interface 420 continues the locking region 430 through the QCB however, preferably a portion of the locking region is shaped or beveled 440 to cooperate with the chamfered top edge 331 of the tool wherein the insertion of the tool into the QCM can activate the QCB thereby urging it so that the biasing arm 410 is compressed into the QCB against the internal back/buttress wall 116.

The QCB is formed of a non-metal material such as a plastic or resin and has the properties of flexibility and strength sufficient to be configured to provide both strength and flexion for the arms 415/417 and to have adequate memory to accept a predetermined amount of compressions of the biasing arm(s) and returns to an uncompressed length. Materials may also include but are not limited to one or more of Polycarbonate, polyethyleneimine, polyacrylamide, polyamides, TPUs, TPEs, HDPE, PTFE, PP, acetyl homopolymers and copolymers, PPSU, and PEEK, PAEK, metals, spring metals, laminates, hybrids and the like. The biasing arm(s) may also be compilations of materials and are not limited to one material. The biasing arms may be formed as part of the QCB or they may be insert molded with the QCB or otherwise affixed thereto.

The biasing arm may be configured to accept sufficient compression and decompression to last for the lifetime of the device it is a part of. In instances of disposable devices, it may be configured to accept a predetermined number of decompressions and compressions sufficient to meet the use requirements, which may include safety margins, of the device it is associated with.

FIGS. 4A-4G show aspects of and/or supporting the cooperation of the QCM and QCB with the tool to catch and release the tool. Also, the arms 415 of the QCB are configured (as previously noted) to cooperate via flexion with capture tabs 117 to secure the QCB in the QCM. The biasing arm 410 when extended (decompressed in its steady state FIG. 8C) secures the tool 425 at its locking grove 330 against the standard specific configuration 308 and the locking region 430.

When compressed, the tail end 412 of the biasing arm 410 is pushed via against the internal back wall 116 in the shaped cavity 108 of the QCM. The movement displaces the catch and release interface 420 which urges the locking region to move away from the tool groove 330 thereby releasing it. When compressed the biasing arm changes its length from "X" to "Y" thereby moving the release interface region relative to the tool.

FIGS. 4A through 4G shows the QCB, the biasing arm and the QCB in a cut-away view within the QCM along line "A-A" of FIG. 2. In FIG. 4B the QCB is shown relative to the internal back wall 116 and the biasing arm 410 is in a compressed state configured to mount and unmount a tool. The elongated tool 325 is illustrated relative to the QCB and the locking groove 330 is visible opposite the locking region 430. The compressed length of the biasing arm "X" is measured from the tail 412 to the distal end 404 of the shoulder, the flex regions 414 are illustrated in compressed state thereby shortening the biasing arm 410 length from its at rest state to a compressed state.

Figure 4C:
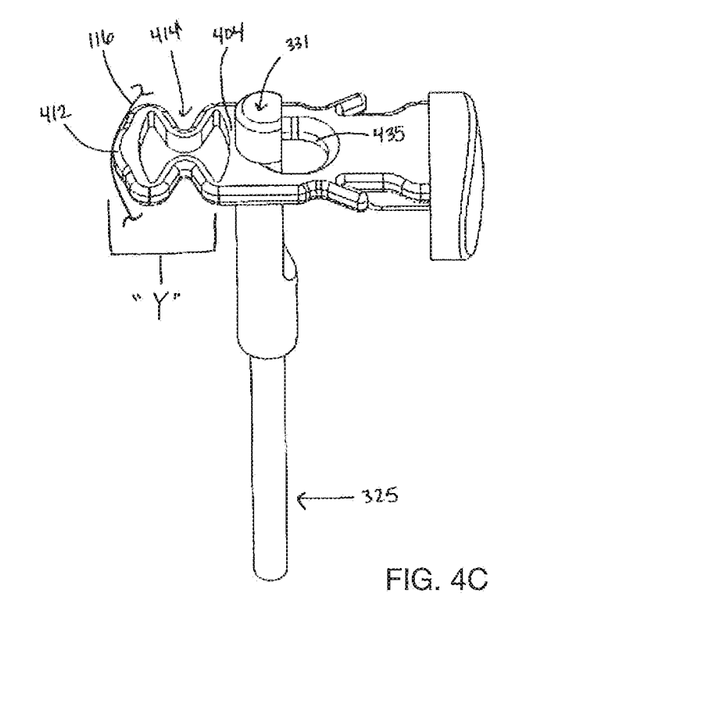
Figure 4E:
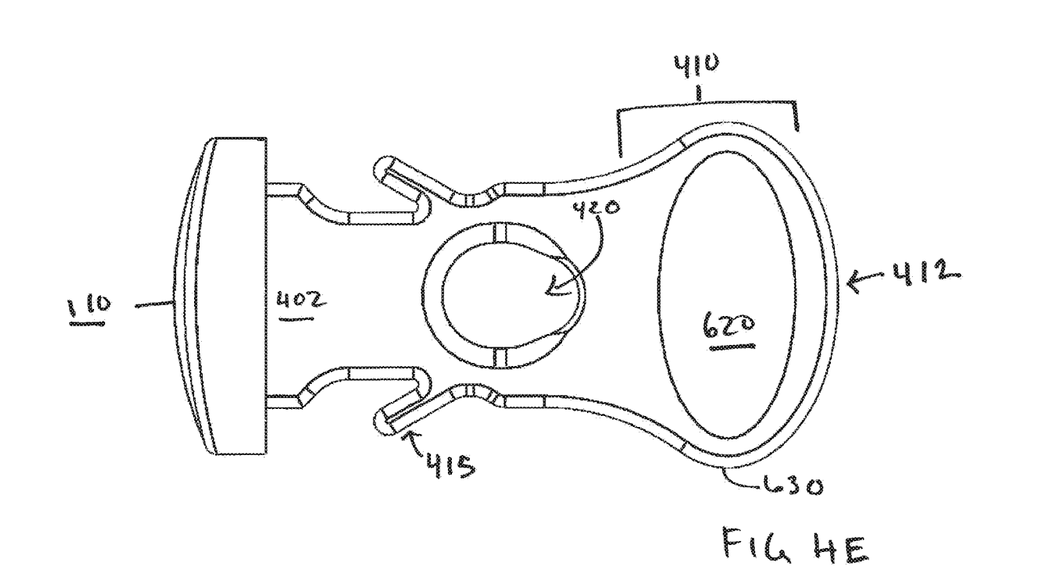

In FIG. 4C the QCB is shown relative to the internal back wall 116 and the biasing arm 410 is in its steady or normal state at rest and uncompressed state, configured to temporarily affix the elongated tool 325 to the QCB whereby the locking groove 330 is held, fastened or otherwise latched in the locking region. The length of the normal or steady state biasing arm "Y" is measured from the tail 412 to the distal end 404 of the shoulder, the flex regions 414 are illustrated in uncompressed state.

FIGS. 4D through 4G show additional exemplars of biasing members having openings which form flexible regions. The QCB shown in FIGS. 4D and 4E each have an opening 600 and 620 respectively. Each opening is generally circular or ovoid. Circularity is not a limitation and the shape may vary. The openings are configured to form flexible regions of the QCB. The shape of the opening or openings (multiple openings are not shown in the interest of brevity) in combination with the flexibility of the material the member is constructed of is a means to select a predetermined force which will be required to compress the biasing arm sufficiently to align same with the pathway 303 to allow insertion of a tool.

The extended shoulder 610 shown in FIG. 4D will move laterally during compression of the tail 412 against the internal back wall 116 thereby temporarily shifting the interface 420 in line with the pathway 303. The extended shoulder 630 shown in FIG. 4E will move laterally during compression of the tail 412 against the internal back wall 116 thereby temporarily shifting the interface 420 in line with the pathway 303.

Figure 4F:
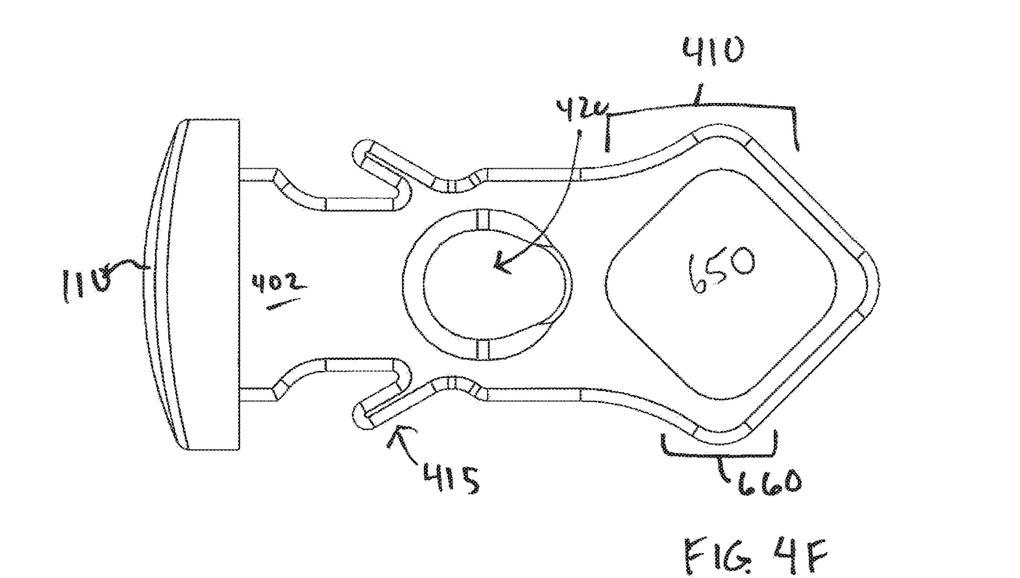

The QCB shown in FIG. 4F has a squricle opening 650. The extended shoulder 660 will move laterally during compression of the tail 412 against the internal back wall 116 thereby temporarily shifting the interface 420 in line with the pathway 303. The extended shoulder 630 shown in FIG. 4E will move laterally during compression of the tail 412 against the internal back wall 116 thereby temporarily shifting the interface 420 in line with the pathway 303.

The QCB shown in FIG. 4G has a triangular opening 670 with a movable base 675 which is displaced into the opening during compression. The base will move axially during compression of the tail 412 against the internal back wall 116 thereby temporarily shifting the interface 420 in line with the pathway 303.

Those of ordinary skill in the art will recognize that a plethora of shaped members and openings may be combined or utilized to provide flexible regions in said member to allow for controlled predicable displacement of the interface to align same with a connection and that such design variations are within the scope of the disclosure.

Figure 5:
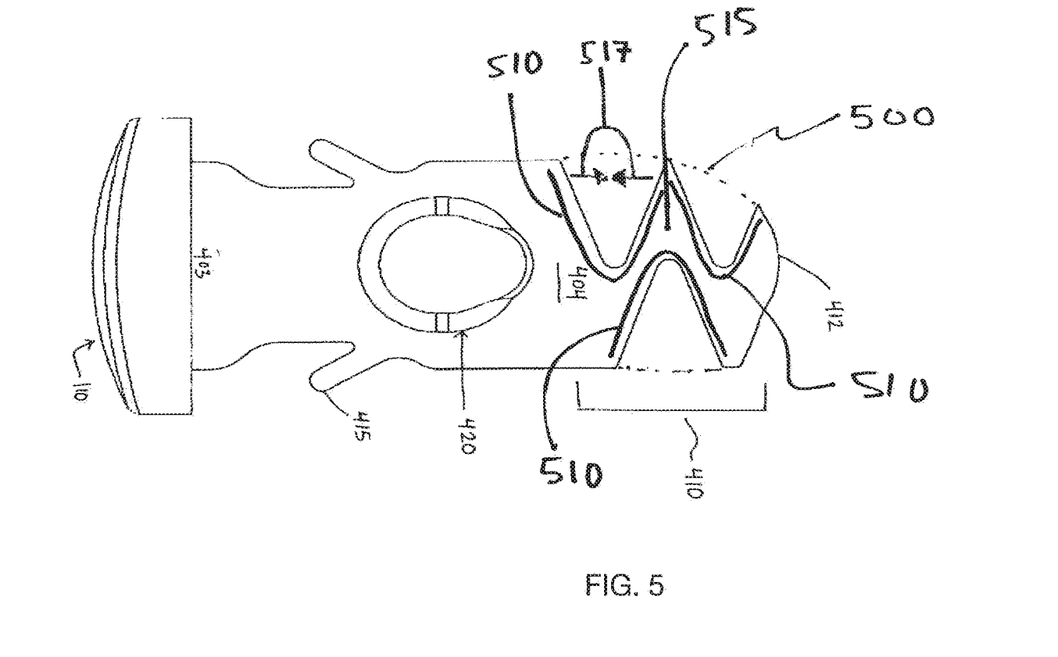
FIGS. 5 and 6 illustrate aspects of additional forms of compressible biasing element of a catch and release connection system; and, FIG. 7 illustrates aspects of another catch and release connection system.

FIG. 5 shows aspects of an alternate biasing arm which replaces the biasing arm shown in FIGS. 4A-4G. The biasing arm 410 should be viewed as a solid member 500 with cut-outs 510 formed therein to cause a configuration (in this illustration zig zag like) having a solid single member 515 with a predefined shape which is configured with cut-out that may be compressed along the line of 517 in response to a compressive force. The compressive force is applied when the tail 412 is pressed against the internal back wall 116 and subjected to a predetermined amount of linear force thereby temporarily closing the compressible regions and shifting the interface 420 in line with the pathway 303.

Figure 6:
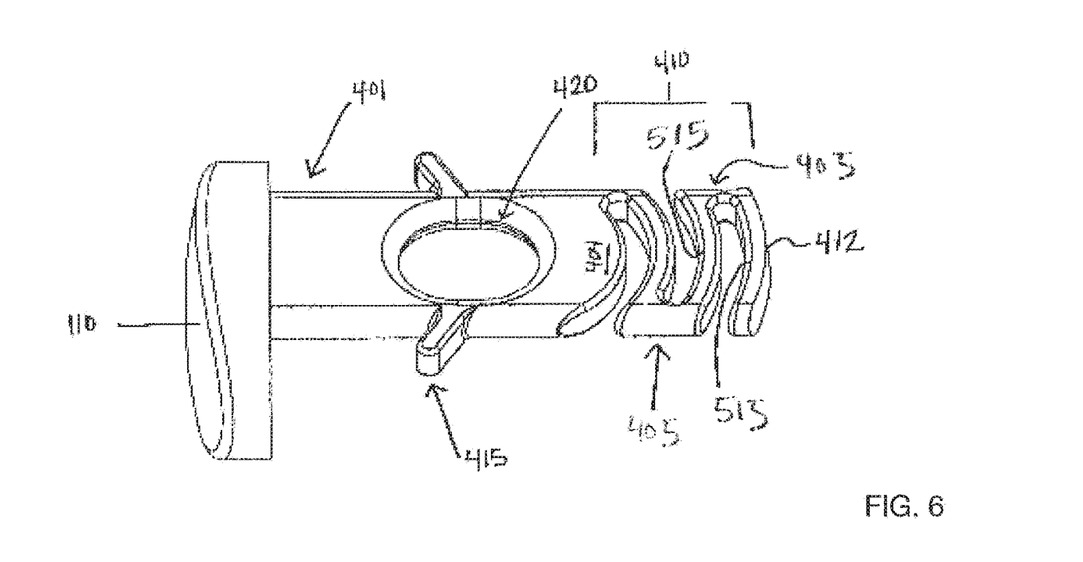

FIG. 6 shows aspects of an alternate biasing arm which replaces the biasing arm shown in FIGS. 4A-4G. The cut-outs 510 formed therein cause a configuration (in this illustration serpentine like) having a single member 515 with a predefined shape spring shape which is configured whereby the cut forms a guide which may partially close when the tail 412 is pressed against the internal back wall 116 and subjected to a predetermined amount of linear force thereby temporarily shifting the interface 420 in line with the pathway 303.

Figure 7:
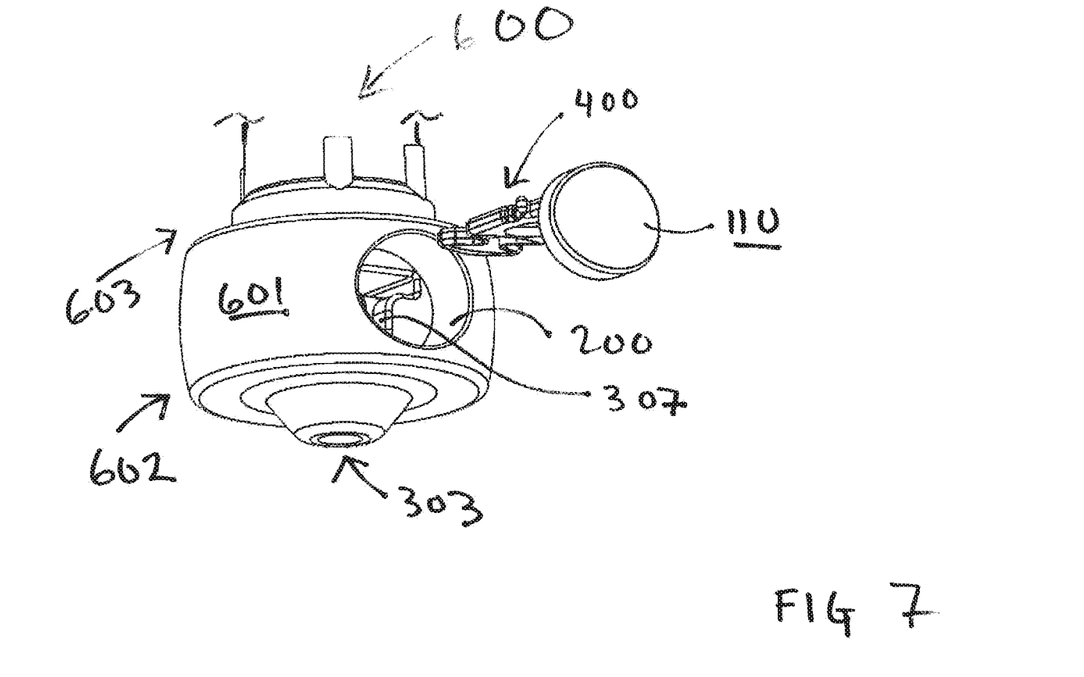

FIG. 7 illustrates a nose and body 600 with an annular wall 601 a proximal end 602 and a distal end 603. The pathway 303 is formed through the proximal end 602 and extends to at least the body catch 307. A button guide 200 is formed through the annular wall and is adjacent to the body catch which is connected to the pathway 303. The QCB fits into the body catch as previously described, however, the QCM is eliminated and the nose is a unitary piece which configured to connect with the QCB.

Those of ordinary skill in the art will recognize that the integral biasing arm may be formed with multiple sub arms and with a variety of flexion regions without departing from the scope of the disclosure.

While the method and apparatus have been described in terms of what are presently considered to be the most practical and preferred implementations, it is to be understood that the disclosure need not be limited to the disclosed implementations. It is intended to cover various modifications and similar arrangements included within the spirit and scope of the claims, the scope of which should be accorded the broadest interpretation so as to encompass all such modifications and similar structures. The present disclosure includes any and all implementations of the following claims.

It should also be understood that a variety of changes may be made without departing from the essence of the disclosure. Such changes are also implicitly included in the description. They still fall within the scope of this disclosure. It should be understood that this disclosure is intended to yield a patent covering numerous aspects of the disclosure both independently and as an overall system and in both method and apparatus modes.

Further, each of the various elements of the disclosure and claims may also be achieved in a variety of manners. This disclosure should be understood to encompass each such variation, be it a variation of an implementation of any apparatus implementation, a method or process implementation, or even merely a variation of any element of these.

Particularly, it should be understood that as the disclosure relates to elements of the disclosure, the words for each element may be expressed by equivalent apparatus terms or method terms—even if only the function or result is the same.

Such equivalent, broader, or even more generic terms should be considered to be encompassed in the description of each element or action. Such terms can be substituted where desired to make explicit the implicitly broad coverage to which this disclosure is entitled.

It should be understood that all actions may be expressed as a means for taking that action or as an element which causes that action.

Similarly, each physical element disclosed should be understood to encompass a disclosure of the action which that physical element facilitates.

Any patents, publications, or other references mentioned in this application for patent are hereby incorporated by reference. In addition, as to each term used it should be understood that unless its utilization in this application is inconsistent with such interpretation, common dictionary definitions should be understood as incorporated for each term and all definitions, alternative terms, and synonyms such as contained in at least one of a standard technical dictionary recognized by artisans and the Random House Webster's Unabridged Dictionary, latest edition are hereby incorporated by reference.

Finally, all referenced listed in the Information Disclosure Statement or other information statement filed with the application are hereby appended and hereby incorporated by reference; however, as to each of the above, to the extent that such information or statements incorporated by reference might be considered inconsistent with the patenting of this disclosure, such statements are expressly not to be considered as made by the applicant.

In this regard it should be understood that for practical reasons and so as to avoid adding potentially hundreds of claims, the applicant has presented claims with initial dependencies only.

Support should be understood to exist to the degree required under new matter laws—including but not limited to United States Patent Law 35 USC 132 or other such laws—to permit the addition of any of the various dependencies or other elements presented under one independent claim or concept as dependencies or elements under any other independent claim or concept.

To the extent that insubstantial substitutes are made, to the extent that the applicant did not in fact draft any claim so as to literally encompass any particular implementation, and to the extent otherwise applicable, the applicant should not be understood to have in any way intended to or actually relinquished such coverage as the applicant simply may not have been able to anticipate all eventualities; one skilled in the art, should not be reasonably expected to have drafted a claim that would have literally encompassed such alternative implementations.

Further, the use of the transitional phrase "comprising" is used to maintain the "open-end" claims herein, according to traditional claim interpretation. Thus, unless the context requires otherwise, it should be understood that the term "compromise" or variations such as "comprises" or "comprising", are intended to imply the inclusion of a stated element or step or group of elements or steps but not the exclusion of any other element or step or group of elements or steps.

Such terms should be interpreted in their most expansive forms so as to afford the applicant the broadest coverage legally permissible.

What is claimed is:

1. A connection system comprising:
   a partially hollow nose comprising a cavity with capture tabs formed therein and configured to mate with a quick connect module (QCM);
   the QCM comprising a body catch and a pathway and configured to cooperate with the cavity of the nose;
   a quick connect body (QCB) comprising a biasing element, a catch and release interface, a top surface, a bottom surface, arms, and a tail end;
   wherein the capture tabs are configured to cooperate with said arms;
   wherein flexible portions of said arms are configured to pass one way into the cavity and catch on the tabs after flexion during passage through the nose past the tabs;
   the QCM and the nose configured to align and cooperate to accept insertion of the QCB through a button guide in an annular wall of the nose into the body catch of the QCM;
   wherein the button guide is configured to align the catch and release interface with the pathway;
   wherein the QCB is insertable in the button guide;
   wherein the QCB affixes the QCM into the nose; and,
   wherein depressing a button at one end of the QCB compresses the biasing element of said QCB aligning the catch and release interface with the pathway of the QCM.

2. The device of claim 1 further comprising:
   at least one rib is extended from the bottom surface of the QCB; and,
   at least one corresponding rib guide in the QCM is configured to accept insertion of the at least one rib.

3. The device of claim 1 wherein the QCB has a proximal end, a distal end, and a locking region connecting the top and bottom surfaces.

4. The device of claim 3, further comprising:
   an internal back wall of the cavity of the QCM; and,
   wherein the biasing element compresses when the tail end is pushed against said internal back wall.

5. The device of claim 4 wherein;
   the biasing element further comprises two sub arms each having a flex region, each sub arm connected at the tail end; and,
   wherein said flex regions are configured to compress when a predetermined force is applied to move the QCB linearly within the body catch, compressing the biasing element on the QCB.

6. The device of claim 4 wherein:
   the biasing element comprises at least one opening connecting the top and bottom surfaces and at least one extended shoulder;
   wherein the at least one extended shoulder moves laterally during compression thereby aligning the interface and the pathway.

7. The device of claim 4 wherein:
   the biasing element is a solid member having at least one cut out; and,
   wherein the at least one cut-out compresses when a predetermined force is applied to the button thereby aligning the interface and the pathway.

8. The device of claim 4 wherein:
   the biasing element has at least one triangular opening and a base; and, wherein the base is displaced into the at least one triangular opening when a predetermined force is applied to the button thereby aligning the interface and the pathway.

9. A connection system comprising:
   a partially hollow nose having an annular wall with a button guide formed therethrough;
   a body catch with a back wall connected to the button guide configured to mate with a quick connect body (QCB);
   the QCB comprising a button, an interface, a tail end, and a biasing element that mates within the body catch;
   the biasing element comprising two sub arms connecting at the tail end, each sub arm comprising a flex region;
   wherein said flex regions are configured to compress when a predetermined force is applied to the tail end to move the QCB linearly within the body catch, compressing the biasing element on the QCB; and,
   a distal end with a pathway therethrough which extends at least to the body catch.

10. The device of claim 9 wherein:
    the biasing element comprises at least one opening connecting a top surface of the QCB, a bottom surface of the QCB, and at least one extended shoulder;
    wherein the at least one extended shoulder moves laterally during compression thereby aligning the interface and the pathway.

11. The device of claim 9 wherein:
the biasing element is a solid member having at least one cut out; and, wherein the at least one cut-out compresses when a predetermined force is applied to the button thereby aligning the interface and the pathway.

12. The device of claim 9 wherein:
the biasing element has at least one triangular opening and a base; and,
wherein the base is displaced into the opening when a predetermined force is applied to the button thereby aligning the interface and the pathway.

13. A connection system comprising:
a partially hollow nose comprising a cavity with capture tabs formed therein and configured to mate with a quick connect module (QCM);
a quick connect module (QCM) comprising a body catch and a pathway and configured to cooperate with the cavity of the nose;
a quick connect body (QCB) comprising a biasing element, a catch and release interface, a top surface, a bottom surface having at least one rib extended therefrom, arms, and a tail end;
the QCM and the nose configured to align and cooperate to accept insertion of the QCB through a button guide in an annular wall of the nose into the body catch of the QCM;
wherein at least one corresponding rib guide in the QCM is configured to accept insertion of the at least one rib;
wherein the button guide is configured to align the catch and release interface with the pathway;
wherein the QCB is insertable in the button guide;
wherein the QCB affixes the QCM into the nose; and,
wherein depressing a button at one end of the QCB compresses the biasing element of said QCB aligning the catch and release interface with a pathway of the QCM.

* * * * *